United States Patent
Lee et al.

(10) Patent No.: US 11,261,353 B2
(45) Date of Patent: Mar. 1, 2022

(54) RUBBER-BASED ADHESIVE COMPOSITION AND RUBBER-BASED ADHESIVE USING SAME

(71) Applicant: LG CHEM, LTD., Seoul (KR)

(72) Inventors: Seung-Won Lee, Seoul (KR);
Eun-Kyung Park, Seoul (KR);
Won-Gu Choi, Anyang-si (KR);
Jang-Soon Kim, Seongnam-si (KR);
Sang-Hwan Kim, Gunpo-si (KR);
Tae-Yi Choi, Gunpo-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/733,895

(22) Filed: Jan. 3, 2020

(65) Prior Publication Data
US 2020/0140725 A1 May 7, 2020

Related U.S. Application Data

(63) Continuation of application No. 15/521,197, filed as application No. PCT/KR2015/011460 on Oct. 28, 2015, now abandoned.

(30) Foreign Application Priority Data

Nov. 11, 2014 (KR) .......................... 10-2014-0155867

(51) Int. Cl.
*C09J 109/00* (2006.01)
*C09J 193/04* (2006.01)
*C09J 121/00* (2006.01)
*C09J 11/08* (2006.01)
*C08L 93/04* (2006.01)

(52) U.S. Cl.
CPC ............. *C09J 109/00* (2013.01); *C09J 11/08* (2013.01); *C09J 121/00* (2013.01); *C09J 193/04* (2013.01); *C08L 93/04* (2013.01)

(58) Field of Classification Search
CPC ................................ C08L 93/04; C09J 193/04
See application file for complete search history.

(56) References Cited

U.S. PATENT DOCUMENTS

| | | | |
|---|---|---|---|
| 3,860,505 A * | 1/1975 | Tarney | C08L 21/00 522/79 |
| 4,183,834 A | 1/1980 | Evans et al. | |
| 5,143,961 A | 9/1992 | Scholl et al. | |
| 5,596,028 A | 1/1997 | Yanagi et al. | |
| 2006/0235121 A1 * | 10/2006 | Burch | C08K 5/101 524/270 |
| 2007/0037908 A1 | 2/2007 | Pille-Wolf | |
| 2011/0071204 A1 | 3/2011 | Takahashi et al. | |

FOREIGN PATENT DOCUMENTS

| | | |
|---|---|---|
| JP | 06-122856 A | 5/1994 |
| JP | 09-263742 A | 10/1997 |
| JP | 2000-309711 A | 7/2000 |
| JP | 4462874 B2 | 5/2010 |
| KR | 10-20090085761 A | 8/2009 |
| KR | 10-2011-0104732 A | 8/2012 |
| KR | 10-2014-0120490 A | 10/2014 |

OTHER PUBLICATIONS

NIH PubChem Gum Rosin (https://pubchem.ncbi.nih.gov/compound/24206434#section=Top) (Year: 2019).
EASTMAN hydrogenated rosin resins (www.eastman.com) accessed Jun. 18, 2019.

* cited by examiner

*Primary Examiner* — Alicia J Sawdon
(74) *Attorney, Agent, or Firm* — Dentons US LLP

(57) ABSTRACT

The present invention relates to a rubber-based adhesive composition and a rubber-based adhesive using the same, the composition including: a rubber-based resin; and a rosin-based resin having at least one hydrophilic group.

11 Claims, No Drawings

RUBBER-BASED ADHESIVE COMPOSITION AND RUBBER-BASED ADHESIVE USING SAME

This application is a Continuation of U.S. patent application Ser. No. 15/521,197, filed Nov. 20, 2017, which is a U.S. National Stage Application of international Application No. PCT/KR2015/011460 filed on Oct. 28, 2015, which claims priority to and the benefit of priority of Korean Patent Application No. 10-2014-0155867 filed on Nov. 11, 2014, all of which are hereby incorporated by reference in their entirety for all purposes as if fully set forth herein.

TECHNICAL FIELD

The present invention relates to a rubber-based adhesive composition and a rubber-based adhesive using the same.

BACKGROUND ART

It is well known in the art that touch materials including a variety of packed electronic devices, a transparent conductive film, or the like require moisture prevention to maintain an excellent operation or a predetermined shelf-life. Furthermore, a lot of interests have been recently focused on the development of an adhesive composition for increasing a service life of a next generation device such as an OLED or a touch screen panel.

An adhesive attaches two or more products having completely different physical properties and the component of the adhesive does not change unless the products are artificially moved. That is, the adhesive is a material having viscoelastic characteristics capable of being bonded firmly even under a low pressure for a short period of time.

Examples of a general adhesive composition include rubber-based, acrylic, silicone-based adhesive compositions, and the like, and among them, the rubber-based adhesive composition has been widely applied to next generation devices such as an OLED or a touch screen panel, which are vulnerable to moisture, due to the excellent effect of preventing water vapor transmission. However, there is a need for developing a rubber-based adhesive having an even better effect of preventing water vapor transmission in order to further increase the service life of the OLED.

DETAILED DESCRIPTION OF THE INVENTION

Technical Problem

The present invention has been made in an effort to provide a rubber-based adhesive composition and the like, the composition including: a rubber-based resin; and a rosin-based resin having at least one hydrophilic group.

However, a technical problem to be achieved by the present invention is not limited to the aforementioned problem, and the other problems that are not mentioned may be clearly understood by the person skilled in the art from the following description.

Technical Solution

The present invention provides a rubber-based adhesive composition including: a rubber-based resin; and a rosin-based resin having at least one hydrophilic group.

The rosin-based resin may have one or more hydrophilic groups selected from the group consisting of a carboxyl group, a hydroxyl group, a carbonyl group, a sulfonic acid group, an amino group, and a phosphoric acid group.

The rosin-based resin may have two to six hydrophilic groups.

The rosin-based resin may include a structure represented by any one of the following [Chemical Formula 1] to [Chemical Formula 7].

[Chemical Formula 1]
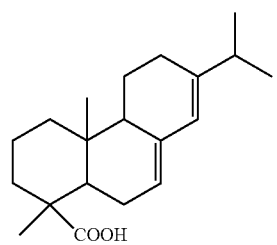

[Chemical Formula 2]
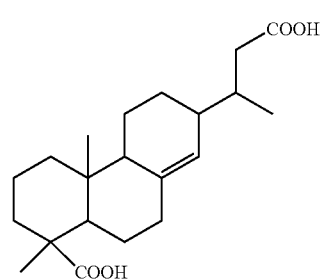

[Chemical Formula 3]
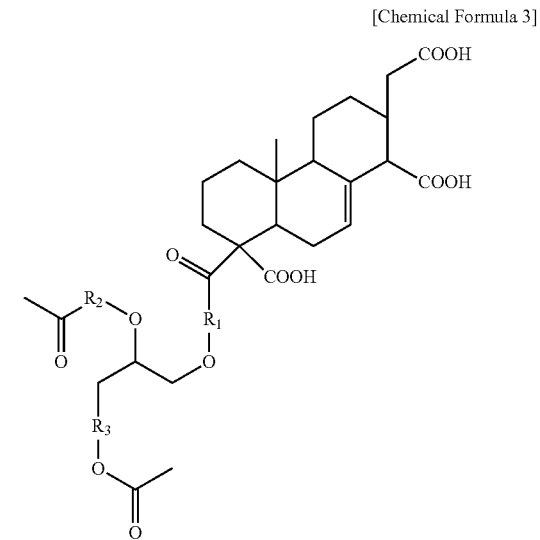

[Chemical Formula 4]
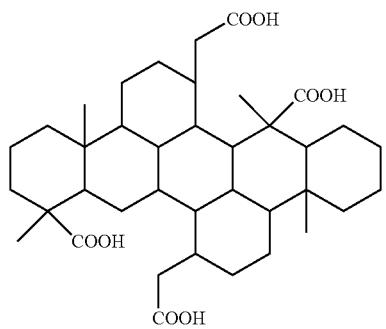

[Chemical Formula 5]

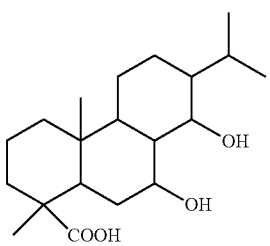

[Chemical Formula 6]

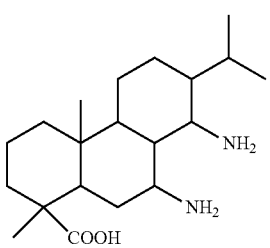

[Chemical Formula 7]

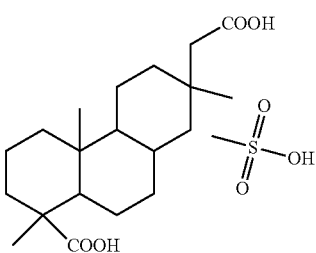

In Chemical Formula 3, $R_1$, $R_2$, and $R_3$ are the same as or different from each other, and are an alkylene group having 1 to 10 carbon atoms.

The rosin-based resin may have a softening point of 70° C. to 110° C.

The rosin-based resin may be included in an amount of 1 part by weight to 40 parts by weight based on 100 parts by weight of the rubber-based adhesive composition.

The rubber-based resin may include one or more selected from the group consisting of a butyl-based rubber, a styrene-butadiene-styrene (SBS)-based rubber, a styrene-butadiene (SB)-based rubber, a styrene-isoprene-styrene (SIS)-based rubber, a styrene-ethylene-butylene-styrene (SEBS)-based rubber, and a natural rubber (LATEX).

The butyl-based rubber may include one or more selected from the group consisting of a butyl rubber, a bromo butyl rubber, and a chlorinated butyl rubber.

The rubber-based resin may be included in an amount of 50 parts by weight to 80 parts by weight based on 100 parts by weight of the rubber-based adhesive composition.

The rubber-based adhesive composition may additionally include one or more selected from the group consisting of a UV curing agent, a UV stabilizer, a photoinitiator, a thermal initiator, an antioxidant, a filler, and a plasticizer.

An exemplary embodiment of the present invention provides a rubber-based adhesive obtained by curing the rubber-based adhesive composition.

The rubber-based adhesive may have a thickness of 10 μm to 200 μm.

The rubber-based adhesive may have an adhesive strength of 500 g/in or more.

The rubber-based adhesive may have a water vapor transmission rate of 10 $g/m^2 \cdot 24$ hr or less under conditions of a temperature of 38° C. and a relative humidity of 90%.

Advantageous Effects

Since a rubber-based adhesive composition according to the present invention includes a rosin-based resin having at least one hydrophilic group, the adhesive strength of the rubber-based adhesive is excellent, and the hydrophilic group of the rosin-based resin can capture moisture, and as a result, the rubber-based adhesive has a particularly excellent effect of preventing water vapor transmission.

By applying the rubber-based adhesive composition to electronic devices or touch materials, it is possible to increase the service life of a next generation device such as an OLED or a touch screen panel to which the rubber-based adhesive composition is applied.

Best Mode

The present inventors have conducted studies on rubber-based adhesive compositions for being applied to electronic devices or touch materials, and have confirmed that a rubber-based adhesive composition having excellent adhesive strength and an excellent effect of preventing moisture transmission may be prepared by including a rosin-based resin having at least one hydrophilic group, as an adhesion enhancer, to the rubber-based adhesive composition, thereby completing the present invention.

Hereinafter, the present invention will be described in detail.

The present invention provides a rubber-based adhesive composition including: a rubber-based resin; and a rosin-based resin having at least one hydrophilic group.

First, the rubber-based adhesive composition according to the present invention includes a rubber-based resin.

Since the rubber-based resin has an excellent effect of preventing water vapor transmission, a rubber-based adhesive composition including the rubber-based resin may be widely applied to a next generation device such as an OLED or a touch screen panel, which are vulnerable to water vapor, as compared to an acrylic adhesive composition.

The rubber-based resin preferably includes one or more selected from the group consisting of a butyl-based rubber, a styrene-butadiene-styrene (SBS)-based rubber, a styrene-butadiene (SB)-based rubber, a styrene-isoprene-styrene (SIS)-based rubber, a styrene-ethylene-butylene-styrene (SEBS)-based rubber, and a natural rubber (LATEX), and the rubber-based resin is more preferably a butyl-based rubber, but the rubber-based resin is not limited thereto.

The butyl-based rubber may have a weight average molecular weight of 50,000 to 2,000,000. The weight average molecular weight refers to an average molecular weight obtained by averaging molecular weights of component molecular species of a polymer compound having a molecular weight distribution with a weight fraction, and when the weight average molecular weight of the butyl-based rubber is less than the range, a problem in terms of durability may be caused due to a small number of physical entanglement sites, and when the weight average molecular weight of the butyl-based rubber is more than the range, the viscosity of the adhesive composition is sharply increased, and as a result, there is a concern in that it is difficult to make the adhesive a thin film, and a problem with the compatibility of process conditions may occur.

The butyl-based rubber may be formed by polymerizing a mixture including isoprene in an amount of 1 mol % to 5 mol % in 100 mol % of the total monomers. When the butyl-based rubber is formed by polymerizing a mixture including isoprene in an amount out of the range in 100 mol % of the total monomers, the butyl-based rubber includes a less amount of double bonds, and thus may degrade the durability of the adhesive composition during the curing, and in the case of the butyl-based rubber containing a larger amount of isoprene, an effect of preventing water vapor transmission is decreased, and it is difficult to obtain a rubber having a high molecular weight.

For example, the butyl-based rubber may include one or more selected from the group consisting of a butyl rubber, a bromo butyl rubber, and a chlorinated butyl rubber.

The bromo butyl rubber and the chlorinated butyl rubber are halogenated butyl rubbers and are prepared by reacting bromine and chlorine atoms in a state where a butyl rubber is molten in a lightweight aliphatic hydrocarbon such as hexane. The bromo butyl rubber typically contains bromine in an amount, of about 1.9 wt % to about 2.1 wt %, and the chlorinated butyl rubber typically contains chlorine in an amount of about 1.1 wt % to about 1.3 wt %. Further, since the bromo butyl rubber and the chlorinated butyl rubber have a very low content of halogen, the bromo butyl rubber and the chlorinated butyl rubber do not belong to a polar rubber, and have unique characteristics of a butyl rubber which is not deformed.

It is preferred that the rubber-based resin is included in an amount of 50 parts by weight to 80 parts by weight based on 100 parts by weight of the rubber-based adhesive composition, but the content is not limited thereto. In this case, when the rubber-based resin is included in an amount of less than 50 parts by weight based on 100 parts by weight of the rubber-based adhesive composition, the rubber-based adhesive composition is disadvantageous in terms of prices because the amount of solvent is relatively increased even though there is no problem with the coatability, and there is a problem with the curing when the solvent, which has not been volatilized, remains because the amount of solvent volatilized is increased during the coating. In addition, when the rubber-based resin is included in an amount of more than 80 parts by weight based on 100 parts by weight of the rubber-based adhesive composition, there is a problem with the coatability due to the increase in viscosity.

First, the rubber-based adhesive composition according to the present invention includes a rosin-based resin having at least one hydrophilic group as an adhesion enhancer.

The rosin-based resin is a material which is added to a rubber-based adhesive composition in order to enhance adhesive strength as an adhesion enhancer.

The rosin in the present invention means a natural resin obtained by distilling pine resin, and includes abietic acid as a main component and a resin acid such as neoabietic acid, levopimaric acid, hydroabietic acid, pimaric acid, and dextonic acid, and examples of the rosin-based resin include not only a natural rosin resin, but also a rosin resin derivative such as an ester rosin resin and a hydrogenated rosin resin.

The rosin-based resin is characterized by having at least one hydrophilic group, and specifically, the rosin-based resin may have at least one hydrophilic group selected from the group consisting of a carboxyl group, a hydroxyl group, a carbonyl group, a sulfonic acid group, an amino group, and a phosphoric acid group. The aforementioned hydrophilic group may capture moisture and thus may further lower the water vapor transmission rate of an existing rubber-based adhesive.

Specifically, it is preferred that the rosin-based resin has two to six hydrophilic groups, but the number of hydrophilic groups is not limited thereto. In this case, the rosin-based resin can capture an optimal amount of moisture by including hydrophilic groups within the range.

More specifically, the rosin-based resin may include a structure represented by any one of the following [Chemical Formula 1] to [Chemical Formula 7].

[Chemical Formula 1]

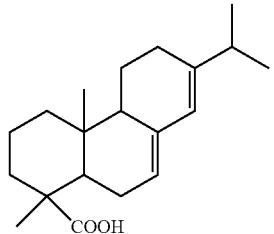

[Chemical Formula 2]

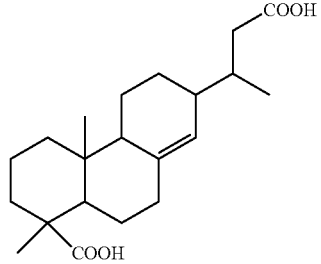

[Chemical Formula 3]

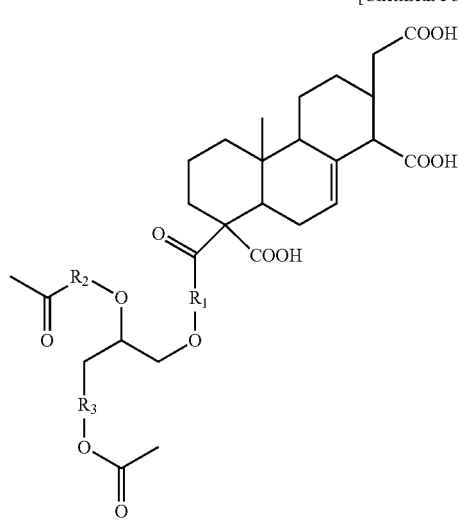

[Chemical Formula 4]

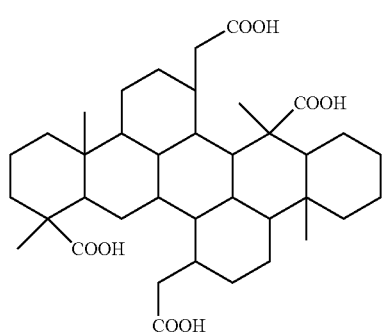

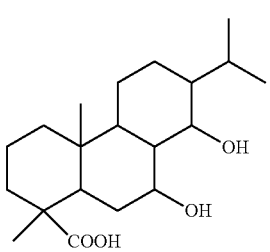

[Chemical Formula 5]

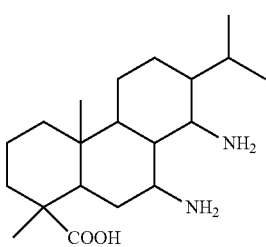

[Chemical Formula 6]

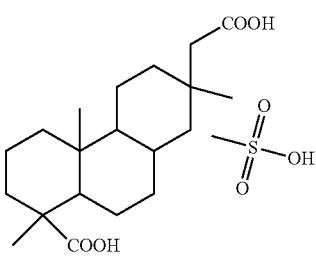

[Chemical Formula 7]

In Chemical Formula 3, $R_1$, $R_2$, and $R_3$ are the same as or different from each other, and are an alkylene group having 1 to 10 carbon atoms.

Specifically, the rosin-based resin may have at least one carboxyl group, may also include [Chemical Formula 1] corresponding to abietic acid, may also include [Chemical Formula 2] or [Chemical Formula 3] corresponding to an abietic acid derivative, and may also include [Chemical Formula 4] corresponding to an abietic acid dimer or trimer.

In particular, when the rosin-based resin has two to six hydrophilic groups by including a structure as represented by [Chemical Formula 2] to [Chemical Formula 4], the hydrophilic groups of the rosin-based resin can capture moisture, and thus has a much better effect of preventing water vapor transmission as compared to the case where the rosin-based resin has one hydrophilic group by including a structure as represented by [Chemical Formula 1].

Furthermore, the rosin-based resin may have another hydrophilic group in addition to a carboxyl group, may also include [Chemical Formula 5] corresponding to an abietic acid derivative having a hydroxyl group in addition to a carboxyl group, may also include [Chemical Formula 6] corresponding to an abietic acid derivative having an amino group in addition to a carboxyl group, and may also include [Chemical Formula 7] corresponding to an abietic acid derivative having a sulfonic acid group in addition to a carboxyl group.

In particular, when the rosin-based resin has a hydroxyl group in addition to a carboxyl group by including a structure as represented by [Chemical Formula 5], the hydroxyl group of the rosin-based resin may capture a larger amount of moisture, and thus has a much better effect of preventing water vapor transmission as compared to the other hydrophilic groups.

Further, it is preferred that the rosin-based resin has a softening point of 70° C. to 110° C., but the softening point is not limited thereto. The softening point generally refers to a temperature at which a material begins to be deformed and softened by heating, and the rosin-based resin may begin to be deformed and softened at 135° C.

Specifically, when the softening point of the rosin-based resin is maintained within the range, the rosin-based resin is advantageous in that the rosin-based resin is maintained in a glassy state under high temperature reliability conditions, and as a result, the thermal deformation rate becomes low, and the high temperature reliability is easily secured.

In contrast, when the rosin-based resin has a softening point of less than 70° C., there may occur a problem in that an adhesion enhancer begins to be softened under a high temperature condition, and as a result, the durability deteriorates, and when the rosin-based resin has a softening point of more than 110° C. a role of the adhesive, which enhances adhesion, may be minimal at normal temperature.

It is preferred that the rosin-based resin is included in an amount of 1 part by weight to 40 parts by weight based on 100 parts by weight of the rubber-based adhesive composition, but the content is not limited thereto. In this case, when the rosin-based resin is included in an amount of less than 1 part by weight based on 100 parts by weight of the rubber-based adhesive composition, there is a problem in that the adhesive strength is not sufficiently exhibited because the adhesion strength to a base material is insufficient, and when the rosin-based resin is included in an amount of more than 40 parts by weight based on 100 parts by weight of the rubber-based adhesive composition, there is a problem in that the durability deteriorates because the rosin-based resin disturbs the curing, so that the curing degree is low.

Further, the rubber-based adhesive composition according to the present invention may additionally include one or more selected from the group consisting of a UV curing agent, a photoinitiator, a thermal initiator, an antioxidant, a filler, and a plasticizer within a range without impairing the physical properties of the rubber-based adhesive composition.

The UV curing agent may include a UV curable resin having a good compatibility with a butyl-based rubber. For example, the UV curing agent may be selected among an acrylate resin, a methacrylate resin, an isocyanate resin, a melamine resin, a urethane resin, an epoxy resin, an acid anhydride, a polyamine resin, and a polymer including a carboxyl group. The UV curing agent may be included in an amount of 1 part by weight to 20 parts by weight, based on 100 parts by weight of the rubber-based adhesive composition.

Examples of the photoinitiator include one or more selected from the group consisting of benzoin methyl ether, 2,4,6-trimethylbenzoyl diphenylphosphine oxide, bis(2,4,6-trimethylbenzoyl) phenylphosphine oxide, α,α-methoxy-α-hydroxyacetophenone, 2-benzoyl-2-(dimethylamino)-1-[4-(4-morphonyl) phenyl]-1-butanone, and 2,2-dimethoxy-2-phenylacetophenone. The photoinitiator may be added in an amount of 0.01 part by weight to 1 part by weight based on 100 parts by weight of the rubber-based adhesive composition.

The rubber-based adhesive composition may include a thermal initiator, and the rubber-based adhesive composition may be constituted of a double curing-type by including both a photoinitiator and a thermal initiator.

The thermal initiator is activated by means of heat generated by decomposing the photoinitiator by means of irradiation with, for example, UV light, and the like, and as a result, the thermal initiator may participate in the curing reaction of the adhesive composition. In this case, examples of the thermal initiator include one or more selected from the group consisting of an azo-based compound, a peroxy-based compound, tert-butyl peracetate, peracetic acid, and potassium persulfate, and the thermal initiator may be added in an amount of 0.01 part by weight to 10 parts by weight based on 100 parts by weight of the rubber-based adhesive composition.

As the antioxidant, a phenol-type antioxidant, a phosphide-type antioxidant, a thioether-type antioxidant, or an amine-type antioxidant may be preferably used.

Further, a filler may be used in order to improve physical properties or fluidity, and examples of the filler may include finely ground quartz, molten silica, amorphous silica, talc, glass beads, graphite, carbon black, alumina, clay, mica, aluminum nitride, and boron nitride. The filler may be added in an amount of 1 part by weight to 10 parts by weight based on 100 parts by weight of the rubber-based adhesive composition.

Examples of the plasticizer include higher alcohols such as liquid paraffin, hydrogenated oil, hydrogenated castor oil, and octyl dodecanol, fatty acid esters such as squalane, squalene, castor oil, liquid rubber (polybutene), and isopropyl myristate, and the like. The plasticizer may be added in an amount of 1 part by weight to 10 parts by weight based on 100 parts by weight of the rubber-based adhesive composition.

Further, the present invention provides a rubber-based adhesive obtained by curing the rubber-based adhesive composition.

The rubber-based adhesive may secure heat resistance through the curing of the rubber-based adhesive composition, and in this case, the curing of the rubber-based adhesive composition may be carried out by using an energy source selected from the group consisting of heat, UV rays, visible rays, infrared ray radiation ray, and electron beam radiation ray.

Since the present invention cures the rubber-based adhesive composition by using UV rays, there is an economic advantage as compared to the case of using another energy source.

It is preferred that the rubber-based adhesive has a thickness of 10 μm to 200 μm, but the thickness is not limited thereto. The thickness of the rubber-based adhesive is maintained within the range, and as a result, the thickness of the rubber-based adhesive may be applied while coinciding with a small thickness of an OLED or a touch screen panel, which has been recently released.

It is preferred that the rubber-based adhesive has an adhesive strength of 500 g/in or more, but the adhesive strength is not limited thereto. An adhesive strength within the range may be maintained by including the rosin-based resin in a predetermined content in the rubber-based adhesive composition.

In addition, it is preferred that the rubber-based adhesive has a water vapor transmission rate of 10 $g/m^2 \cdot 24$ hr or less under conditions of a temperature of 38° C. and a relative humidity of 90%, but the water vapor transmission rate is not limited thereto. Due to the hydrophilic groups which the rosin-based resin has in the rubber-based adhesive composition, the rubber-based adhesive having a small thickness may maintain a water vapor transmission rate within the range.

Hereinafter, preferred Examples for helping the understanding of the present invention will be suggested. However, the following Examples are provided only to more easily understand the present invention, and the contents of the present invention are not limited by the following Examples.

EXAMPLES

Example 1

6.18 g of a rosin-based resin (Dymerex, Eastman Chemical Resins Inc.) having two carboxyl groups, 3.17 g of HDDA (Sigma Aldrich Co., Ltd.) as a UV curing agent, and 1.74 g of a photoinitiator (Ciba Specialty Chemicals, Irgacure 651) were added to 163 g of a butyl rubber solution, 64 g of toluene as a solvent was added thereto, and then a rubber-based adhesive composition was prepared by sufficiently stirring the resulting mixture.

Example 2

A rubber-based adhesive composition was prepared in the same manner as in Example 1, except that 12.36 g of a rosin-based resin (Dymerex, Eastman Chemical Resins Inc.) having two carboxyl groups was added.

Example 3

A rubber-based adhesive composition was prepared in the same manner as in Example 1, except that 6.18 g of a rosin-based resin (Eastman Chemical Resins Inc., Lewsisol 29-M) having three carboxyl groups was added.

Example 4

A rubber-based adhesive composition was prepared in the same manner as in Example 1, except that 6.18 g of a rosin-based resin having one carboxyl group and two hydroxyl groups was added.

Example 5

A rubber-based adhesive composition was prepared in the same manner as in Example 1, except that 6.18 g of a rosin-based resin having one carboxyl group and two amine groups was added.

Example 6

A rubber-based adhesive composition was prepared in the same manner as in Example 1, except that 6.18 g of a rosin-based resin having two carboxyl groups and one sulfonic acid group was added.

Comparative Example 1

A rubber-based adhesive composition was prepared in the same manner as in Example 1, except that 6.18 g of a hydrocarbon-based resin (Exxon Mobil Corp., Escorez 1102) was added instead of the rosin-based resin.

Comparative Example 2

0.42 g of HDDA (Sigma Aldrich Co., Ltd.) as a UV curing agent and 3.16 g of a photoinitiator (Ciba Specialty Chemicals, Irgacure 651) were added to a composition in which 100 g of an acrylic resin having a weight ratio of HEA (Sigma Aldrich Co., Ltd.) and IBOA (Sigma Aldrich Co., Ltd.) of 6:4 and 105 g of HEA (Sigma Aldrich Co., Ltd.) as a diluted monomer were added, thereby preparing an adhesive composition.

Experimental Examples

1. Measurement of Adhesive Strength

Adhesives having a thickness of 50 μm were formed by curing the adhesive compositions prepared in Examples 1 to 6 and Comparative Examples 1 and 2. Each of the adhesives formed was cut into 10 cm with a length of 1 inch, and attached to the surface of a glass base material being an object to be attached by rolling a 2 kg roller back and forth five times, and after 30 minutes, the adhesive strength was measured by adjusting the peel speed to 300 mm/min by means of a texture analyzer (Texture Technologies Corp.).

2. Measurement of Water Vapor Transmission Rate

Adhesives having a thickness of 50 μm were formed by curing the adhesive compositions prepared in Examples 1 to 6 and Comparative Example 1. For each of the adhesives formed, a water vapor transmission rate (WVTR) was measured by means of Labthink TSY-T3 by pouring a predetermined amount of water into a cup under conditions of a temperature of 38° C. and a relative humidity of 90%, loading the adhesive formed thereon, capping the cup, evaporating the water for 24 hours, and then using a weight loss of water evaporated.

The results of measuring the adhesive strength and the water vapor transmission rate as described above are summarized and shown in the following Table 1.

TABLE 1

| Classifiation | Adhesive strength (g/in) | WVTR (g/m² · 24hr) |
|---|---|---|
| Example 1 | 893 | 8.21 |
| Example 2 | 1282 | 7.64 |
| Example 3 | 930 | 8.03 |
| Example 4 | 975 | 7.12 |
| Example 5 | 1081 | 7.95 |
| Example 6 | 1254 | 8.85 |
| Comparative Example 1 | 910 | 10.75 |
| Comparative Example 2 | 2.530 | 72.1 |

As shown in Table 1, it can be confirmed that the adhesive compositions according to Examples 1 to 6 includes a rosin-baaed resin having at least one hydrophilic group and maintains an adhesive strength at a predetermined level, and as compared to the adhesives according to Comparative Examples 1 and 2, at least one hydrophilic group of the rosin-based resin may capture a sufficient amount of water vapor, and as a result, the adhesives have a much better effect of preventing moisture transmission.

In particular, when comparing the cases of using the same amount of the adhesion enhancer, it can be confirmed that the adhesive composition according to Example 3 uses a rosin-based resin having three carboxyl groups as the adhesion enhancer/and the adhesive composition according to Example 1 has a much better effect of preventing water vapor transmission than the case of using a rosin-based resin having one carboxyl group as the adhesion enhancer.

Further, when comparing the cases of having the same number of hydrophilic groups, it can be confirmed that the cases where a rosin-based resin having a hydrophilic group (a hydroxyl group or an amino group) other than a carboxyl group is used as the adhesion enhancer as in Examples 4 and 5 have a much better effect of preventing moisture transmission than the case where a rosin-based resin having only carboxyl groups is used as the adhesion enhancer as in Example 3, and it can be confirmed that the case a rosin-based resin having one carboxyl group and two amine groups was used as the adhesion enhancer as in Example 5 has a significantly better effect of preventing water vapor transmission.

The above-described description of the present invention is provided for illustrative purposes, and the person skilled in the art to which the present invention pertains will understand that the present invention can be easily modified into other specific forms without changing the technical spirit or essential features of the present invention. Therefore, it should be understood that the above-described Examples are illustrative only in all aspects and are not restrictive.

The invention claimed is:

1. A rubber-based adhesive, which is a cured product of a rubber-based adhesive composition comprising:

a rubber-based resin; and a rosin-based resin having three hydrophilic groups, and wherein at least one of the three hydrophilic groups is a carboxyl group, and at least another one of the three hydrophilic groups is selected from the group consisting of a hydroxyl group, a sulfonic group, and an amino group.

2. The rubber-based adhesive of claim 1, wherein the rubber-based adhesive has a thickness of 10 μm to 200 μm.

3. The rubber-based adhesive of claim 1, wherein the rubber-based adhesive has an adhesive strength of 500 g/in or more.

4. The rubber-based adhesive of claim 1, wherein the rubber-based adhesive has a water vapor transmission rate of 10 g/m²·24 hr or less at a temperature of 38° C. and a relative humidity of 90%.

5. The rubber-based adhesive of claim 1, wherein the rosin-based resin comprises a structure represented by any one of the following [Chemical Formula 5] to [Chemical Formula 7]:

[Chemical Formula 5]

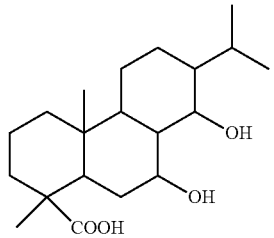

[Chemical Formula 6]

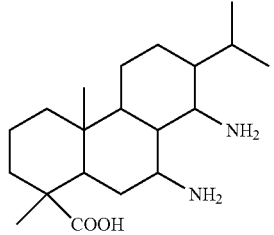

[Chemical Formula 7]

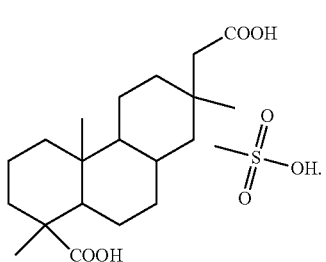

6. The rubber-based adhesive of claim 1, wherein the rosin-based resin has a softening point of 70° C. to 110° C.

7. The rubber-based adhesive of claim 1, wherein an amount of the rosin-based resin is 1 part by weight to 40 parts by weight based on 100 parts by weight of the rubber-based adhesive composition.

8. The rubber-based adhesive of claim 1, wherein the rubber-based resin comprises one or more selected from the group consisting of a butyl-based rubber, a styrene-butadiene-styrene (SBS)-based rubber, a styrene-butadiene (SB)-based rubber, a styrene-isoprene-styrene (SIS)-based rubber, a styrene-ethylene-butylene-styrene (SEBS)-based rubber, and a natural rubber (LATEX).

9. The rubber-based adhesive of claim 8, wherein the butyl-based rubber comprises one or more selected from the group consisting of a butyl rubber, a bromo butyl rubber, and a chlorinated butyl rubber.

10. The rubber-based adhesive of claim 1, wherein an amount of the rubber-based resin is 50 parts by weight to 80 parts by weight based on 100 parts by weight of the rubber-based adhesive composition.

11. The rubber-based adhesive of claim 1, further comprising one or more selected from the group consisting of a UV curing agent, a UV stabilizer, a photoinitiator, a thermal initiator, an antioxidant, a filler, and a plasticizer.

* * * * *